United States Patent [19]
Hamann et al.

[11] 3,801,909
[45] Apr. 2, 1974

[54] MEASURING DEVICE FOR ELECTRICAL COMPONENTS

[75] Inventors: Gunter Hamann; Gunter Zschieschank, both of Heilbronn, Germany

[73] Assignee: Licentia Patent-Verwaltungs-G.m.b.H., Frankfurt am Main, Germany

[22] Filed: May 18, 1972

[21] Appl. No.: 254,572

[30] Foreign Application Priority Data
May 28, 1971 Germany.............................. 2126541
May 28, 1971 Germany............................. 7120753

[52] U.S. Cl. ........................... 324/158 F, 324/158 P
[51] Int. Cl. ....................... G01r 31/00, G01r 31/22
[58] Field of Search ......... 324/158 F, 158 P, 158 T, 324/158 R, 158 D; 339/191 R, 191 M, 192 R

[56] References Cited
UNITED STATES PATENTS
3,165,674  1/1965  Swan ............................... 324/158 F Primary Examiner—Alfred E. Smith
Assistant Examiner—Ernest F. Karlsen
Attorney, Agent, or Firm—Spencer & Kaye

[57] ABSTRACT

A measuring device for electrical components with strip or wire formed leads parallel to each other comprises a measuring mounting and a component receiver having a frame co-operating with the measuring mounting for centering purposes, a plurality of insulating members within the frame, arranged in laminar abutting formed and each having a surface for supporting a component lead, spring pivot means for urging the frame and insulating members to pivot in a direction perpendicular to the support surfaces of the insulating members and further pivot means for enabling pivoting movement of the frame and the insulating members in the plane of the support surfaces.

6 Claims, 3 Drawing Figures

PATENTED APR 2 1974　　3,801,909

MEASURING DEVICE FOR ELECTRICAL COMPONENTS

BACKGROUND OF THE INVENTION

The present invention relates to a measuring device for an electrical component with strip or wire formed leads running parallel to each other.

Such a measuring device may include a measuring mounting and a receiver for the component with platelet-form parts composed in a laminar manner, on which one each is provided for the accommodation of a component lead.

Hitherto, in automatic measuring devices for electronic components, for example for transistors and diodes, the receivers consisted of a moulded plastics plate with a recess or with lateral boundaries, wherein, in each case, an object to be measured was inserted between the boundaries or into the recess. The measuring mounting comprised generally a multiplicity of wires passed through a carrier plate, which wires were placed resiliently on the leads of the component to be measured during the measuring operation. This measuring device, used up to now, has the disadvantage that, in the case of the dimensions of semiconductor components, which are usual today, and having very narrow or thin leads, an adjustment of the measuring contacts on to the leads is difficult and often impossible.

In addition, a measuring device has already been proposed, in which the measuring receiver includes platelet-shaped parts put together in a laminar manner. In this case, screening and insulating parts were arranged between two parts which, in each case, served as the receiver of an electrode lead.

SUMMARY OF THE INVENTION

According to the invention, there is provided a measuring device for an electrical component with strip or wire formed leads which run parallel to one another, comprising a measuring mounting, a component receiver for receiving the component to be measured and including a frame for co-operating with said measuring mounting for centering said component receiver in respect to said measuring mounting, a plurality of insulating members within said frame, arranged laminarly and abutting each other, each having a support surface for supporting a lead of said component to be measured, sprung pivot means for said frame and said insulating members for urging said frame and said insulating members individually to pivot in a direction perpendicular to said support surfaces of said insulating member and further pivot means for enabling pivoting movement of said frame and said insulating members in the plane of said support surfaces of said insulating members.

BRIEF DESCRIPTION OF THE DRAWINGS

The invention will now be described in greater detail, by way of example, with reference to the drawings, in which.

DESCRIPTION OF THE PREFERRED EMBODIMENT

Figure 1:
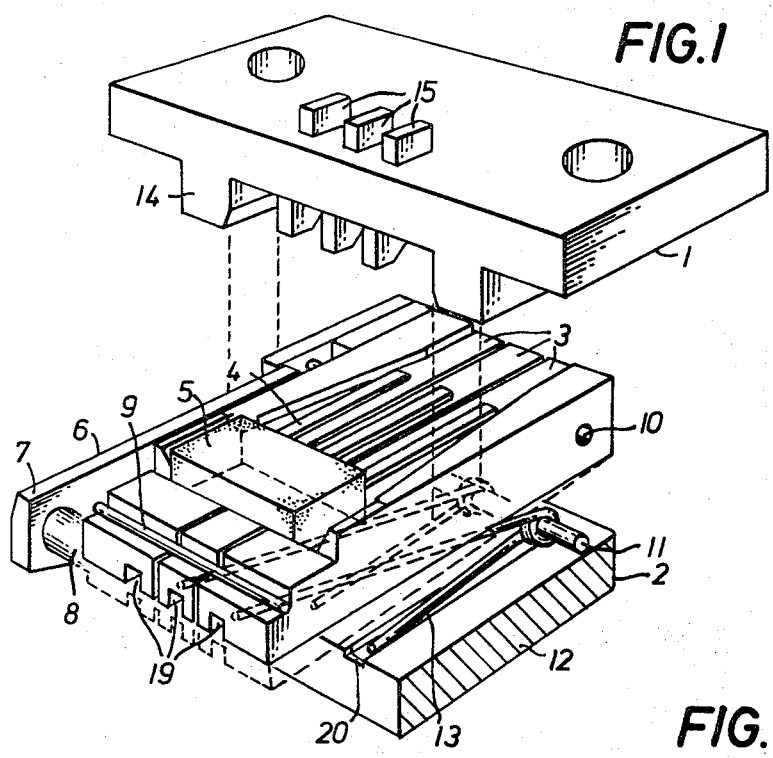
FIG. 1 shows one form of a measuring mounting and the accommodation in a perspective view.

Basically, a measuring device for an electrical component with strip or wire, formed leads running parallel to each other includes a measuring mounting and a receiver, for the component, with platelet-form parts arranged in a laminar manner, on which one each is provided for the accommodation of a component lead it is proposed that the laminar parts, consisting of insulating material, abut each other directly and are individually sprung, in that all laminar parts of the accommodation are arranged in a frame serving the centering of the accommodation with respect to the measuring mounting, which frame is separately sprung in such a manner that the frame together with the laminar parts is pivotable in a direction perpendicular to the accommodation surface and in that the accommodation has an axis of rotation about which it is pivotable, in the automatic system line-up, on the measuring mounting in the plane of the accommodation surface.

The measuring device of the older proposal is substantially improved by the measuring device in accordance with the invention. Thus, the new device is pivotable both in the vertical and horizontal direction and thus fits automatically, on joining together the receiver and the measuring mounting, the position of the component to be measured.

According to an advantageous further development of the device in accordance with the invention, the platelets, put together in a laminar manner, are connected at one end by a spindle, about which they are pivotable independently of each other, against the spring force of the springs supporting them in the vertical direction or in a direction perpendicular to the support surface. In this way it is achieved that each platelet forming a support fits exactly on the electrode feed line lying thereon, so that it is ensured, that all electrodes are pressed against the contact pieces of the measuring mounting with the same contact pressure.

The outer jaws of the frame, which jaws run parallel to the laminar platelets, are preferably interconnected by a web, which, for example, extends over the laminar platelets at the ends away from the supported end of the platelets. This web serves as entrainment means, on pivoting the frame about the spindle of the laminar platelets. In so doing it is ensured that the support surface can be swung out in its totality, which, above all, is of importance if a component is introduced into the receiver in a twisted manner or if two components are inserted into the receiver at the same time. In these cases, the measuring receiver swings out with its total support surface and thus prevents any damage of the receiver or the mounting.

The laminar parts are preferably supported by wire springs, the counter bearing of which is a base plate. This base plate is preferably part of a body which is U-shaped in cross-section. The laminar parts and the frame enclosing them are arranged between the side pieces of this body, the pivoting axis of the laminar parts and of the frame being supported in the side pieces of the U-shaped body.

The device in accordance with the invention is particularly suitable for measuring the characteristics of electronic components, such as transistors and diodes with feed lines which run parallel to each other. This applies both for transistors in plastics housings and for those in metal housings. The measuring device is, for example, built into a rotary measuring table, a number of measuring receivers being secured on the rotor. After inserting a transistor in each receiver under the individual measuring heads, which, in each case, includes a measuring mounting, and the mechanical and electrical parts belonging thereto. The circular table is then raised so that the feed lines are pressed against the contact parts of the measuring mounting in a resilient manner.

Referring now to the drawings, the measuring mounting comprises an insulating body 1, through which platelet-shaped contacts 15 provided for connection to component feed lines, are passed. On the side facing the receiver, the measuring mounting has centering jaws adapted to the inner side, between which centering jaws the frame 6 of the receiver 2 lie, on joining together the receiver and the measuring mounting, so that the electrode feed lines 4 of the component 5 are automatically set to the contacts 15.

Figure 2:
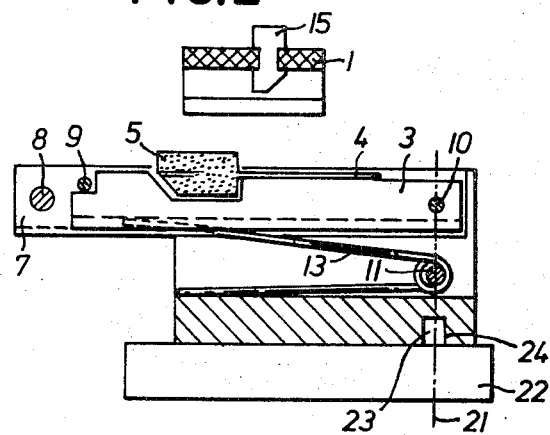
FIG. 2 is a longitudinal section of the mounting of FIG. 1.

The receiver comprises in the case of a transistor measuring mounting, of three parts 3, put together in a laminar form, of insulating material. The laminations form, at one end, a recess in which the head of the component 5 is inserted. If a component is set in the receiver, the electrode leads 4 come to rest on the laminations 3, which, for example, consist of plastics insulating material. The laminations are surrounded by a frame 6 which consists of the two outer jaws 7. FIG. 1 shows, for the sake of clarity, only one of these jaws, whereas, in the end view of FIG. 3, the two jaws can be seen. The two jaws are held together at their unsupported end by a first web 8 which is also shown in section in FIG. 2. The frame 6 and the laminations 3 have a common spindle 10, which is supported in the side pieces 17 of a body 16, which is of U-shaped in cross section. A further spindle 11, which acts as a spring carrier, is arranged below this spindle between the two side pieces 17.

Each individual lamination 3 is individually sprung by a wire spring 13 with respect to the base plate 12 of the body 16. Each spring 13, wound about the spindle 11, engages with its free end in a groove 19 which is formed in the underside of each lamination, whereas the other free end of the spring 13 engages in a grove 20 of the base plate. Thus each lamination can be pivoted independently of the other laminations about the spindle 10 in a direction perpendicular to the support surface of the component.

Figure 3:
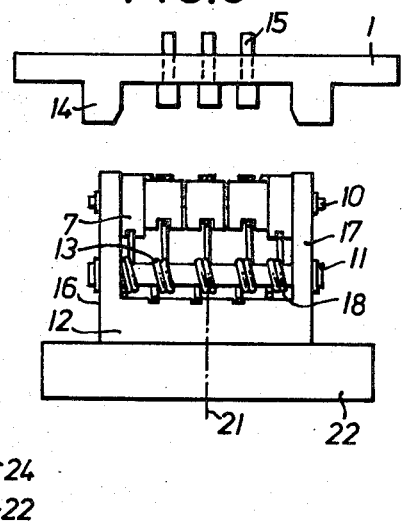
FIG. 3 is a rear view of the mounting of FIG. 1.

As is particularly clear in FIG. 3, the outer jaws 7 of the frame 6 are also sprung with respect to the base plate. At the unsupported end of the frame the jaws 7 are connected to a web 9 (FIG. 1), which extends over the free end of the laminations 3. If, therefore, the whole frame 6 is pivoted about the spindle 10, this web 9 also entrains the laminations 3 in one direction. This is necessary to prevent damage to the mounting and to the components with faulty equipment. The springs of the frame 6 are given the reference numeral 18 in FIG. 3. Springs 13 and 18 and the spindles 10 and 11 are components of a spring pivot mechanism.

The base plate 12 is pivotable about an axis 21. To this end, there is arranged for example in a base plate 22, a pin 23 which engages in an opening 24 of the base plate 12. As can be seen from FIG. 2, this rotation point is arranged, for example, below the spindle 10. The measuring receiver can thus also be pivoted in the plane of the component element support surface. In so doing it is ensured that the whole body 16 together with the laminations secured thereto are bought in the correct position by the centering jaws 14 of the measuring mounting 1, so that the measuring contacts 15 of the mounting are exactly in communication with the electrode feed lines 4, wherein, by virtue of the individually sprung laminations, each electrode is pressed at the corresponding contact with the same pressure.

The jaws 7 of the frame 6 can be provided with indentation on the outer side in which the correspondingly adapted adjusting jaws 14 of the measuring mounting engages when joining together the two parts.

The measuring mounting can be adapted with respect to the shape and the number of other components with any number of electrode leads by changing the laminations.

It will be understood that the above description of the present invention is susceptible to various modifications, changes and adaptations.

We claim:

1. A measuring device for an electrical component with strip or wire leads which run parallel to one another, comprising a measuring mounting, a component receiver for receiving the component to be measured, said component receiver including a frame for cooperating with said measuring mounting for centering said component receiver with respect to said measuring mounting and a plurality of insulating members within said frame arranged laminarly and abutting each other, each said insulating member having a support surface for supporting a lead of said component to be measured, spring pivot means operatively associated with both said frame and said insulating members for individually urging said frame and said insulating members to pivot in a direction perpendicular to said support surfaces of said insulating member and further pivot means for enabling pivoting movement of said frame and said insulating members in the plane of said support surfaces of said insulating members.

2. A measuring device as defined in claim 1, wherein said spring pivot means comprises a spindle connecting all said insulating members at one end thereof but permitting individual movement of said insulating members thereabout and a plurality of springs, each acting on an individual one of said insulating members.

3. A measuring device as defined in claim 1, wherein said frame comprises a pair of jaws running parallel to said insulating members and a web for connecting together said pair of jaws and for entraining said insulating members when said frame pivots in said direction perpendicular to said support surfaces of said insulating members in one sense.

4. A measuring device as defined in claim 3, wherein said jaws define indentations on their outersides which engage suitably adapted jaws of said measuring mounting when said measuring mounting and said component receiver are engaged together.

5. A measuring device as defined in claim 1, wherein said spring pivot means includes a plurality of wire springs which act between said insulating members and said frame and a base plate.

6. A measuring device as defined in claim 5, further comprising a body of U-shaped cross section including a base portion forming said base plate and two arm portions and a spindle, forming part of said spring pivot means connected to said arm portions of said body and passing through said frame and said insulating members which are both situated between said arm portions.

* * * * *